(12) United States Patent
Schroeder

(10) Patent No.: US 6,346,808 B1
(45) Date of Patent: Feb. 12, 2002

(54) CRANKSHAFT POSITION SENSOR

(75) Inventor: Thaddeus Schroeder, Rochester Hills, MI (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 09/515,077

(22) Filed: Feb. 28, 2000

(51) Int. Cl.$^7$ .................................................. G01B 7/14
(52) U.S. Cl. ............................ 324/207.21; 324/207.25
(58) Field of Search ...................... 324/207.21, 207.22, 324/207.25, 601, 691, 207–20, 207.12, 173; 219/121.66; 338/32 R; 123/406.61

(56) References Cited

U.S. PATENT DOCUMENTS

| | | | | |
|---|---|---|---|---|
| 4,835,467 A | * | 5/1989 | Gokhle ........................ 324/166 |
| 4,926,122 A | | 5/1990 | Schroeder et al. ..... 324/207.13 |
| 4,939,456 A | | 7/1990 | Morelli et al. ......... 324/207.21 |
| 5,570,016 A | * | 10/1996 | Schroeder et al. ..... 324/207.25 |
| 5,731,702 A | * | 3/1998 | Schroeder et al. ..... 324/207.21 |
| 5,754,042 A | * | 5/1998 | Schroeder et al. ..... 324/207.25 |

* cited by examiner

Primary Examiner—Safet Metjahic
Assistant Examiner—Subhash Zaveri
(74) Attorney, Agent, or Firm—Margaret A. Dobrowitsky

(57) ABSTRACT

A method of accurately emulating any desired tooth/slot format of a desired target wheel from a predetermined tooth/slot arrangement of a rotating actual target wheel used in conjunction with an MR position sensor. The passage of two sequential slots of differing widths or two sequential teeth of differing widths of the actual target wheel determine the rising and falling edge of one tooth of the desired target wheel and define one tooth and one slot of the desired target wheel. The actual target wheel, has, preferably, 2n teeth and 2n slots of two distinct sequential widths whereby the desired target wheel is emulated to have n teeth and n slots. The two MRs of the position sensor are aligned in the circumferential direction of the actual target wheel so as to generate two angularly offset signals (first and second voltages, respectively) from the passage of a single slot of the actual target wheel. The offset signals are input to a signal conditioning circuit. Within the signal conditioning circuit, the two sensor signals (first and second voltages) are differentially amplified to produce a differential signal whereby the width of the slot is used to encode a binary position voltage, high or low. The two distinct sequential slot/tooth widths of the actual target wheel are used to identify a tooth edge of the desired target wheel as rising or falling and, hence, define the teeth and slots of the desired target wheel. Alternatively, the present invention could be implemented with width encoded teeth instead of width encoded slots.

8 Claims, 6 Drawing Sheets

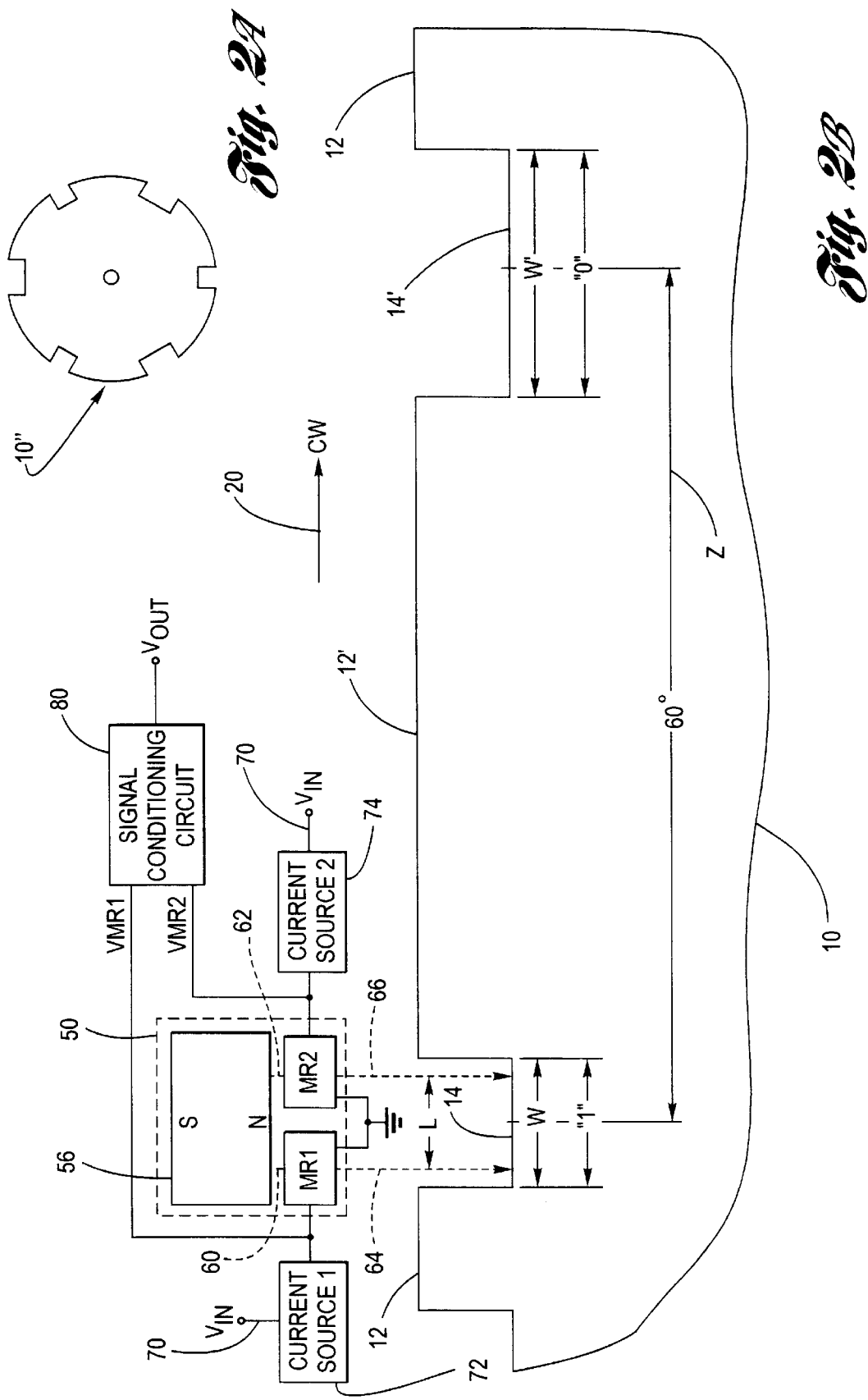

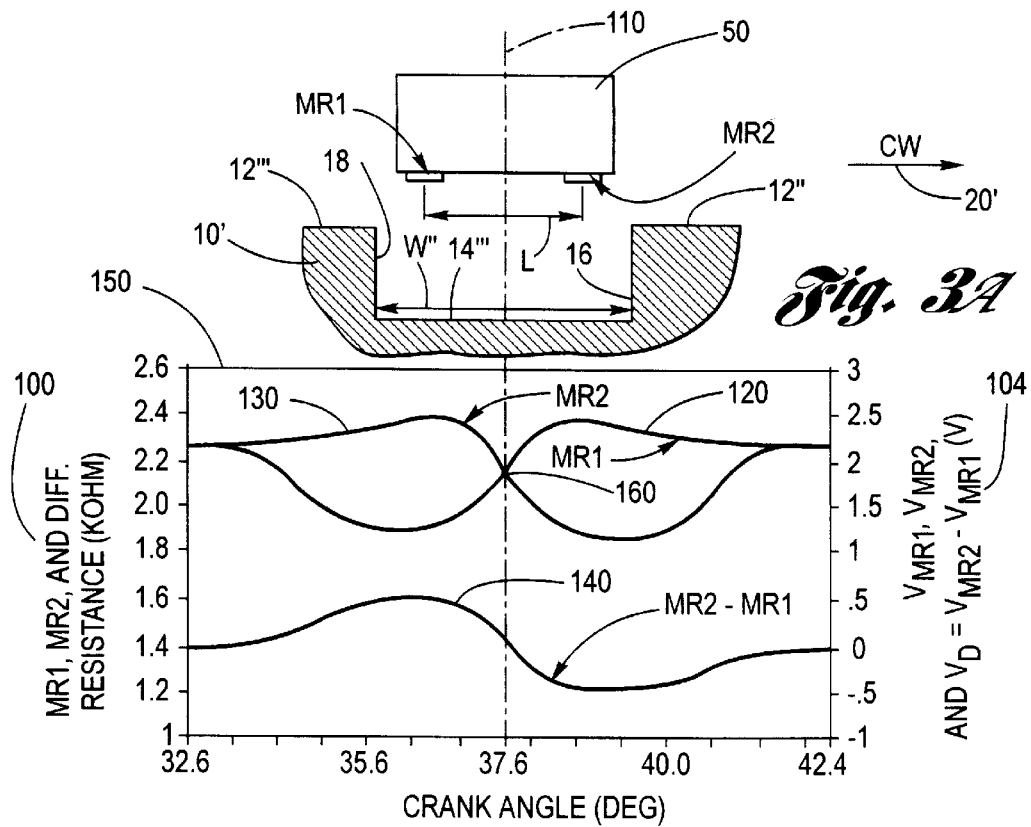
*Fig. 3A*
*Fig. 3B*
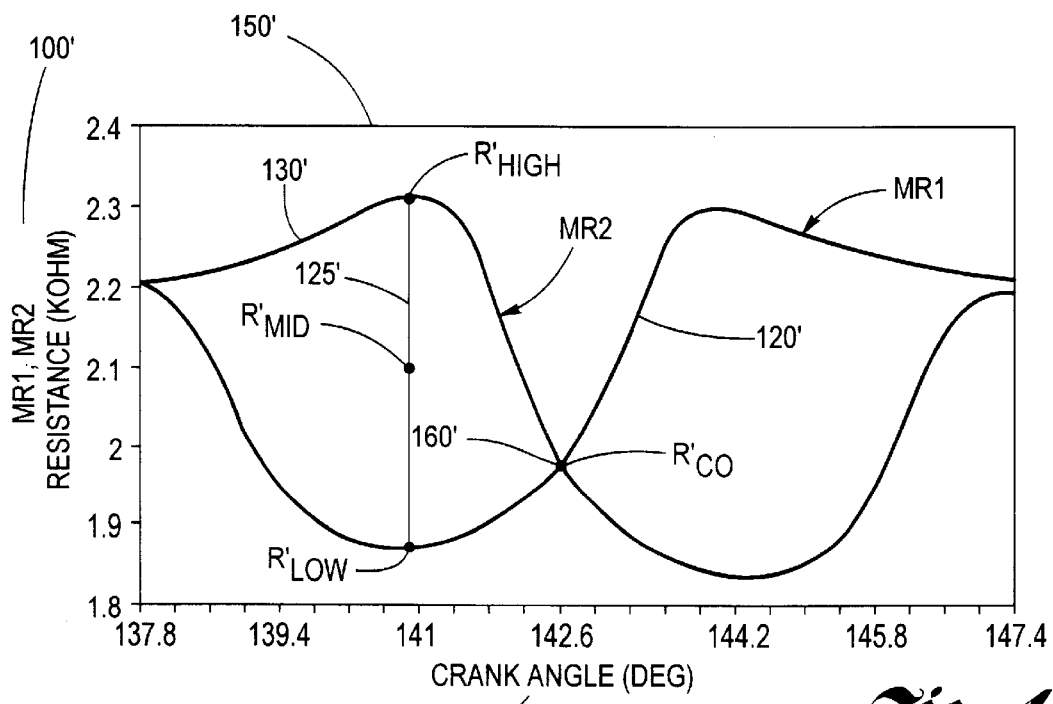
*Fig. 4*

CRANKSHAFT POSITION SENSOR

TECHNICAL FIELD

The present invention relates generally to a method of sensing crankshaft rotational position.

BACKGROUND OF THE INVENTION

It is well known in the art that the resistance modulation of magnetoresistors can be employed in position and speed sensors with respect to moving magnetic materials or objects (see for example U.S. Pat. Nos. 4,835,467, 4,926,122, and 4,939,456). In such applications, the magnetoresistor (MR) is biased with a magnetic field and electrically excited, typically, with a constant current source or a constant voltage source. A magnetic (i.e., ferromagnetic) object rotating relative and in close proximity to the MR, such as a toothed wheel, produces a varying magnetic flux density through the MR, which, in turn, varies the resistance of the MR. The MR will have a higher magnetic flux density and a higher resistance when a tooth of the rotating target wheel is adjacent to the MR than when a slot of the rotating target wheel is adjacent to the MR. The use of a constant current excitation source provides an output voltage from the MR that varies as the resistance of the MR varies.

Increasingly more sophisticated spark timing and emission controls introduced the need for crankshaft sensors capable of providing precise position information during cranking. Various combinations of magnetoresistors and single and dual track toothed or slotted wheels (also known as encoder wheels and target wheels) have been used to obtain this information (see for example U.S. Pat. Nos. 5,570,016, 5,731,702, and 5,754,042).

The electronic control module (ECM) of an engine specifies the required format of the crankshaft position signal. Invariably, the target wheel (i.e., encoder) is designed to generate a magnetic signal conforming to the format of the required signal. That is, preferably, the target wheel will have teeth at crank angles where the position signal should have a high value and slots at crank angles where the position signal should have a low value. The position sensor should convert the mechanical pattern of the target wheel, as closely as possible, into a corresponding electrical signal.

FIG. 1A is a schematic representation of an exemplar automotive environment of use according to this prior art scheme, wherein a target wheel 410 is rotating about an axis 410', such as for example in unison with a crankshaft, a drive shaft or a cam shaft, and the rotative position thereof is to be sensed. Rotative position of the target wheel 410 is determined by sensing the passage of a tooth edge 412, either a rising tooth edge 412a or a falling tooth edge 412b, using a differential MR sequential sensor 50. A tooth edge 412 is considered rising or falling depending upon the direction of rotation of the target wheel 410 with respect to the magnetoresistive sensors MR1 and MR2. MR1 is considered leading and MR2 is considered lagging if the target wheel 410 is rotating in a clockwise (CW) direction whereas if the target wheel is rotating in a counterclockwise (CCW) direction then MR1 is considered lagging whereas MR2 is considered leading. For purposes of example, the target wheel 410 will be assumed to be rotating in a CW direction in the views.

The differential MR sequential sensor 50 employs two magnetoresistor elements, MR1 and MR2, which are biased by a permanent magnet 56, wherein the magnetic flux 418 and 420 emanating therefrom are represented by the dashed arrows. The magnetic flux 418 and 420 pass from the permanent magnet 56 through the magnetoresistors MR1 and MR2 and through the air gaps 422 and 424 to the target wheel 410. The target wheel 410 is made of a magnetic material having teeth 426 and spacings 428 therebetween and the sensor signal $V_S$ is available between terminals 430 and 432.

The example of the target wheel 410 in FIG. 1A is a 3X target wheel. This target wheel 410 and the associated sensor 50 utilize analog signals, available between terminals 430 and 432, which are converted into a 3 bit digital signal that is repeated every 360 degrees of rotation of the wheel. The ideal, error free, situation is depicted by the digital signal in FIG. 1B wherein each bit 426' represents a particular angular position of the target wheel 410 and adjacent bits are angularly separated by 120 degrees representing the tooth pattern 426 of the target wheel and the desired signal pattern whereby the rising edges 412a of the teeth occur at the rising edges of the signal 412'a and the falling edges 412b of the teeth occur at the falling edges of the signal 412'b.

However, the actual digital signal is depicted in FIG. 1C wherein each bit 426" represents a particular angular position of the target wheel 410 and adjacent bits are not angularly separated by 120 degrees due to an angular position error E whereby the rising edges 412a of the teeth 426 do not occur at the rising edges of the signal 412"a and an angular position error E' whereby the falling edges 412b of the teeth do not occur at the falling edges of the signal 412"b. The angular position errors E and E' are caused by graduality of change of magnetic field at approach and recession of the teeth, which is sometimes compensated by making the teeth narrower. Another component of the error is caused by variations in the air gaps 422 and 424 as well as variations in temperature.

Another target wheel of interest is the 24X target wheel (see for example U.S. Pat. No. 5,570,016). This wheel and its associated sensor utilize analog signals which are converted into a 24 bit digital signal that is repeated every 360 degrees of rotation of the wheel. Each bit represents a particular position of the wheel and adjacent bits are angularly separated by 15 degrees. In general, target wheels of interest may be specified as nX target wheels where n is an integer number of teeth or slots. These wheels and their associated sensors utilize analog signals which are converted into an n bit digital signal that is repeated every 360 degrees of rotation of the wheel. Each bit represents a particular position of the wheel and adjacent bits are angularly separated by (360/n) degrees. Prior art uses of these wheels have utilized sensors incorporating two matched MRs with a more costly dual track wheel when high accuracy was required or with less expensive single track wheels when less accuracy was acceptable.

What is needed is a method and apparatus to accurately locate the rising and falling edges of the teeth of a single track target wheel whereby the position of the crankshaft can be obtained very accurately and inexpensively.

SUMMARY OF THE INVENTION

The present invention provides a method of emulating any desired tooth/slot format of a desired target wheel from a predetermined tooth/slot arrangement of a rotating actual target wheel used in conjunction with an MR position sensor.

According to the method of the present invention, the passage of two sequential slots of differing widths or two sequential teeth of differing widths of the actual target wheel determine the rising and falling edge of one tooth of the desired target wheel and define one tooth and one slot of the desired target wheel. The actual target wheel, has, preferably, 2n teeth and 2n slots of two distinct sequential widths whereby the desired target wheel is emulated to have n teeth and n slots.

For example, an actual target wheel having 6 teeth and 6 slots of two distinct sequential widths, can be used to emulate a 3X desired target wheel with an accuracy attainable previously with a two track target wheel; or, for another example, a actual target wheel having 24 teeth and 24 slots of two distinct sequential widths can be used to emulate a 12X desired target wheel.

The two MRs of the position sensor, are matched, having matched magnetic biasing and powered by matched current sources, and are aligned in the circumferential direction of the actual target wheel so as to generate two angularly offset signals (first and second voltages, respectively) from the passage of a single slot of the actual target wheel. The offset signals are input to a signal conditioning circuit. Within the signal conditioning circuit, the two sensor signals (first and second voltages) are differentially amplified to produce a differential signal whereby the width of the slot is used to encode a binary position voltage, high or low. For example, a wide slot may be a low voltage and encoded as a binary "0" while a narrow slot may be a high voltage and encoded as a binary "1" although the reverse binary assignments could also be used. These binary assignments (the high and low outputs) of the conditioning circuit reliably identify the rising and falling edges of the teeth of the desired target wheel. That is, two distinct sequential slot/tooth widths of the actual target wheel are used to identify a tooth edge of the desired target wheel as rising or falling and, hence, define the teeth and slots of the desired target wheel. Upon detection of a slot of the actual target wheel, the signal conditioning circuit determines the location of the slot center and whether the slot represents a rising edge or falling edge of a tooth of the desired target wheel and then sets its output voltage respectively high or low and thereby emulate the format of the desired target wheel.

For example, a narrow slot of the actual target wheel is used to identify a tooth edge of the desired target wheel as rising and upon determining the location of the slot center of the narrow slot of the actual target wheel the signal conditioning circuit sets its output voltage high, for example, to thereby denote the rising edge of a tooth of the desired target wheel and define a first edge of a tooth and corresponding end of a slot of the desired target wheel. Subsequently, after the passage of a tooth of the actual target wheel, the next slot of the actual target wheel would be a wide slot and is used to identify a tooth edge of the desired target wheel as falling, for example. Upon determining the location of the slot center of the wide slot of the actual target wheel, the signal conditioning circuit sets its output voltage low to denote the falling edge of a tooth of the desired target wheel and thereby define a second edge of a tooth and corresponding beginning of a slot of the desired target wheel. Subsequently, after the passage of the next tooth of the actual target wheel, the following slot of the actual target wheel would be another narrow slot and the above mentioned process repeats.

Alternatively, the present invention could be implemented with width encoded teeth instead of width encoded slots.

Accordingly, it is an object of the present invention to provide a method for improved position sensing of a rotating article.

BRIEF DESCRIPTION OF THE DRAWINGS

FIG. 2A depicts an example of a 6X target wheel of the present invention for emulating a 3X desired target wheel.

FIG. 2B depicts an example of the preferred environment of use of the present invention.

FIG. 3A depicts a slot of arbitrary width of the target wheel relative to a differential sequential sensor.

FIG. 3B shows MR resistances and signal outputs from the passage of an arbitrary slot of a rotating target wheel, as related to the arbitrary position shown in FIG. 3A.

FIG. 4 shows MR resistances and signal outputs from the passage of a wide slot of a rotating target wheel.

DETAILED DESCRIPTION OF THE PREFERRED EMBODIMENT

Figure 1A:
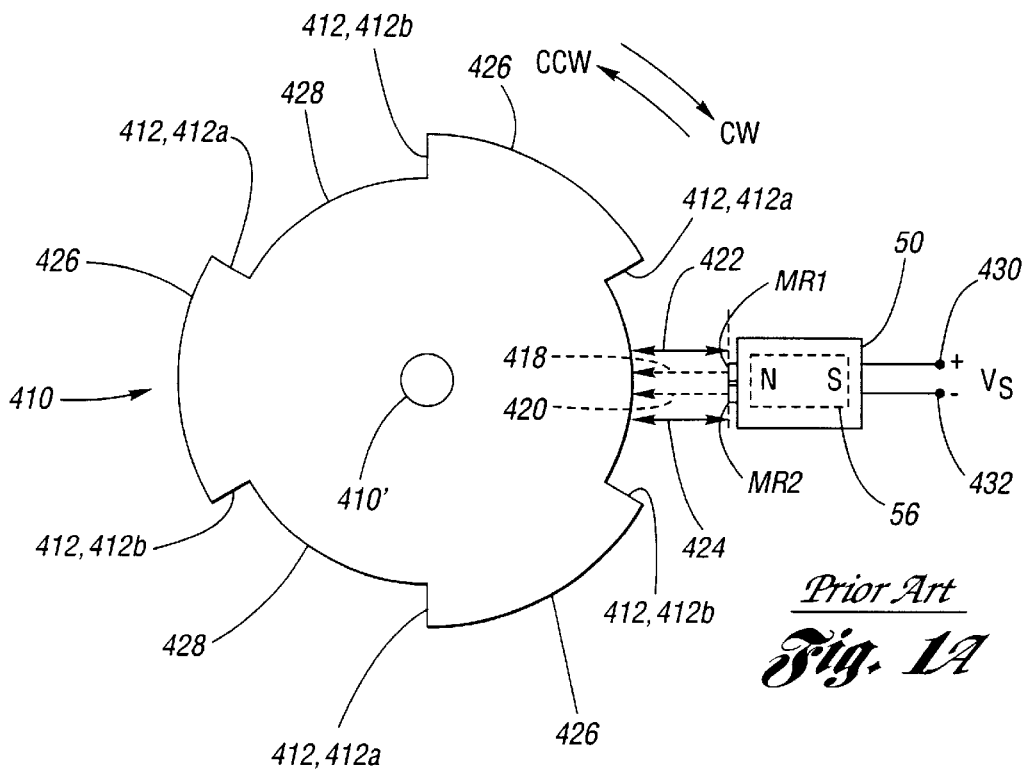
FIG. 1A depicts an example of the prior art environment of use.

The method according to the present invention provides for emulation of any desired target wheel format by generating a crankshaft position signal corresponding to a desired target wheel format, for example the 3X target wheel 410 of FIG. 1A, by using a actual target wheel, for example the 6X target wheel 10" of FIG. 2A, which determines the rising and falling edges of the teeth of the desired target wheel by means of narrow slots of two differing widths of the actual target wheel wherein detection of position of rotation of the actual target wheel is via the outputs of a differential sensor employing two matched MRs to extract bit position of rotation information. The centers of the slots of the actual target wheel accurately and reliably identify the rising and falling edges of the teeth of the desired target wheel. Two distinct sequential slot widths of the actual target wheel are used to identify a tooth edge of the desired target wheel as rising or falling and, hence define the teeth and slots of the desired target wheel. Upon detection of a slot of the actual target wheel, a signal conditioning circuit determines the location of the slot center and whether the slot represents a rising edge or falling edge of a tooth of the desired target wheel and then sets its output voltage respectively high or low, thereby emulating the format of the desired target wheel. For example, a narrow slot of the actual target wheel is used to identify a tooth edge of the desired target wheel as rising and upon determining the location of the slot center of the narrow slot of the actual target wheel, the signal conditioning circuit sets its output voltage high, for example, denoting the rising edge of a tooth of the desired target wheel and defines a first edge of a tooth and corresponding end of a slot of the desired target wheel. Subsequently, after the passage of a tooth of the actual target wheel, the next slot of the actual target wheel would be a wide slot and is used to identify a tooth edge of the desired target wheel as falling, for example. Upon determining the location of the slot center of the wide slot of the actual target wheel the signal conditioning circuit sets its output voltage low denoting the falling edge of a tooth of the desired target wheel and defines a second edge of a tooth and corresponding beginning of a slot of the desired target wheel. Subsequently thereafter, after the passage of the next tooth of the actual target wheel, the following slot of the actual target wheel would be another narrow slot and the above mentioned process is repeated.

Hence, in the aforementioned manner, the passage of two sequential slots of differing widths, or passage of two sequential teeth of differing widths, of the actual target wheel determine precisely the rising and falling edge of one tooth of the desired target wheel and define one tooth and one slot of the desired target wheel. The actual target wheel, mentioned above, is the target wheel of interest in the context of the present invention and, thus, has, preferably, 2n teeth and 2n slots of two distinct sequential widths whereby a first nX target wheel is emulated. That is, for example, a target wheel having six teeth and six slots of two distinct sequential widths, for example target wheel 10" of FIG. 2A, would be used to emulate a 3X target wheel, for example target wheel 410 of FIG. 1A, while a target wheel having 24 teeth and 24 slots of two distinct sequential widths would be used to emulate a 12X desired target wheel. Alternatively, the present invention could be implemented with width encoded teeth instead of width encoded slots. Hereinafter, an "actual target wheel" will be referred to simply as a "target wheel".

For purposes of example, a target wheel having 6 teeth and 6 slots is utilized in the following discussion to emulate the 3X desired target wheel. The target wheel is toothed with wide and narrow slots between teeth circumferentially such that, preferentially but not exclusively, 6 zones are created wherein each zone occupies 60 degrees circumferentially measured from the center of one slot to the center of an adjacent slot. Within the context of the present invention, the target wheel may also be toothed with wide and narrow teeth circumferentially such that, preferentially but not exclusively, 6 zones are created wherein each zone occupies 60 degrees circumferentially measured from the center of one tooth to the center of an adjacent tooth.

The two matched MRs of the sensor, having matched magnetic biasing and powered by matched current sources, are aligned in the circumferential direction of the target wheel and generate two angularly offset signals (first and second voltages, respectively) from the passage of a single slot of the target wheel which are input to a signal conditioning circuit. Within the signal conditioning circuit, the two sensor signals (first and second voltages) are differentially amplified to produce a differential signal whereby the width of the slot is used to encode a binary position voltage, high or low. For example, a wide slot may be a low voltage and encoded as a binary "0" while a narrow slot may be a high voltage and encoded as a binary "1" although the reverse binary assignments could also be used.

Empirical testing and/or theoretical modeling is required to determine the optimal width of an arbitrary slot with respect to the spacing between the MRs such that the magnetic symmetry, the matched MR elements, and the matched current sources cause a magnetic flux density to be sensed by the MRs when they are equidistant from the center of the slot such that the output resistances of the two MRs and, thus, their output signals become equal (crossover) in the middle of the slot whereby the crossover occurs at a value of resistance (or output signal) equal to the average value or midpoint value, to be further exemplified later, of the highest and lowest resistance (or output signal) taken at the peak value of the differential resistance (or output signal) between the two MRs during the passage of the slot. For example, crossover occurs at the midpoint level if the slot width is equal to the MR spacing plus, approximately, 1.2 mm.

Empirical testing and/or theoretical modeling is also required to determine the optimal width of an arbitrary tooth with respect to the spacing between the MRs such that the magnetic symmetry, the matched MR elements, and the matched current sources cause a magnetic flux density to be sensed by the MRs when they are equidistant from the center of the tooth such that the output resistances of the two MRs and, thus, their output signals become equal (crossover) in the middle of the tooth whereby the crossover occurs at a value of resistance (or output signal) equal to the average value or midpoint value of the highest and lowest resistance (or output signal) taken at the peak value of the differential resistance (or output signal) between the two MRs during the passage of the tooth. For example, crossover occurs at the midpoint level if the tooth width is equal to the MR spacing minus, approximately, 1.2 mm.

Empirical testing and/or theoretical modeling is required to determine the optimal width of a wide or narrow slot with respect to the spacing between the MRs such that the magnetic symmetry, the matched MR elements, and the matched current sources cause a magnetic flux density to be sensed by the MRs when they are equidistant from the center of the slot such that the output resistances of the two MRs and, thus, their output signals become equal (crossover) in the middle of the slot whereby, for a wide slot, crossover occurs at a value of resistance (or output signal) less than the average value or midpoint value of the highest and lowest resistance (or output signal) taken at the peak value of the differential resistance (or output signal) between the two MRs during the passage of the wide slot and, for a narrow slot, crossover occurs at a value of resistance (or output signal) greater than the average value or midpoint value of the highest and lowest resistance (or output signal) taken at the peak value of the differential resistance (or output signal) between the two MRs during the passage of the narrow slot. For example, the width of a narrow slot is equal to the width of a slot at which crossover occurs at the midpoint level (as calculated above) minus, approximately, 1.8 mm whereas the width of a wide slot is equal to the width of a slot at which crossover occurs at the midpoint level (as calculated above) plus, approximately, 1.6 mm. The low level signal from a wide slot is assigned the binary value of "0" while the high level signal is assigned the binary value of "1" although the reverse assignments of binary values could also be used.

Alternatively, the present invention could be implemented by width encoded teeth instead of slots whereby empirical testing and/or theoretical modeling is required to determine the optimal width of a wide or narrow tooth with respect to the spacing between the MRs such that the magnetic symmetry, the matched MR elements, and the matched current sources cause a magnetic flux density to be sensed by the MRs when they are equidistant from the center of the tooth such that the output resistances of the two MRs and, thus, their output signals become equal (crossover) in the middle of the tooth whereby, for a wide tooth, crossover occurs at a value of resistance (or output signal) greater than the average value or midpoint value of the highest and lowest resistance (or output signal) taken at the peak value of the differential resistance (or output signal) between the two MRs during the passage of the wide tooth and, for a narrow tooth, crossover occurs at a value of resistance (or output signal) less than the average value or midpoint value of the highest and lowest resistance (or output signal) taken at the peak value of the differential resistance (or output signal) between the two MRs during the passage of the narrow tooth. For example, the width of a narrow tooth is equal to the width of a tooth at which crossover occurs at the midpoint level (as calculated above) minus, approximately, 1.8 mm whereas the width of a wide tooth is equal to the width of a tooth at which crossover occurs at the midpoint level (as calculated above) plus, approximately, 1.6 mm. The low level signal from a narrow tooth can be assigned the binary value of "0" while the high level signal from a wide tooth can be assigned the binary value of "1" although the reverse assignments of binary values could also be used.

FIG. 2B is a schematic representation of an exemplar automotive environment of use according to the present invention, wherein a 6X target wheel 10 is rotating, such as for example in unison with a crankshaft, a drive shaft or a cam shaft, and the rotative position thereof is to be sensed. Rotative position of the target wheel 10 is determined by sensing the passage of a narrow slot 14 or a wide slot 14' using a differential sequential sensor 50. The differential sequential sensor 50 employs two matched magnetoresistor (MR) elements, MR1 and MR2, which are biased by a permanent magnet 56, wherein the magnetic flux 60 and 62 emanating therefrom is represented by the dashed arrows. The magnetic flux 60 and 62 passes from the permanent magnet 56, through the magnetoresistors MR1 and MR2 and through the air gaps 64 and 66 to the target wheel 10. The target wheel 10 is made of a magnetic (i.e., ferromagnetic) material having teeth 12 and 12' and spacings 14 and 14' therebetween. The target wheel 10 is toothed with narrow slots 14 and wide slots 14' circumferentially such that, for example, when rotating in a clockwise (CW) direction 20, the angular spacing between the center of a narrow slot and the center of a wide slot is 60 degrees thereby creating 6 zones Z. In this regard for example, a narrow slot may circumferentially extend 4.3 mm, and a wide slot may then extend about 7.8 mm, wherein the depth of the slot may be about 3 mm. It is to be understood that the terms "narrow" and "wide" refer to a narrow slot being circumferentially not as extended (long) as that of a wide slot.

Rotative position of the target wheel 10 is determined by sensing the passage of a narrow slot 14 or a wide slot 14' within a zone Z by the differential sequential sensor 50 and arbitrarily assigning a binary (bit) value of "0" to a wide slot and a binary (bit) value of "1" to a narrow slot. Every 360 degrees of rotation of the exemplified target wheel 10, 6 individual bit values are generated, one for each zone, wherein each bit represents a particular angular position of the target wheel 10.

MR1 and MR2 are aligned in the circumferential direction of the target wheel 10 and generate two angularly offset signals from the passage of a single narrow slot 14 or the passage of a single wide slot 14' of the target wheel which are input to a SIGNAL CONDITIONING CIRCUIT 80. Within the SIGNAL CONDITIONING CIRCUIT 80, the two sensor signals are differentially amplified to produce a differential signal whereby the width of the slot is used to encode a binary voltage, high or low. The output resistances of MR1 and MR2 and, thus, their output signals become equal (crossover) in the middle of a narrow slot 14 or a wide slot 14' whereby a wide slot of width W' causes the crossover to occur at a lower value of resistance (or output signal) than that of a narrow slot 14 of width W as previously described. The low level signal from a wide slot 14' is arbitrarily assigned the binary value of "0" while the high level signal is assigned the binary value of "1" although the reverse assignments of binary values could also be used. Alternatively, the present invention could be implemented by width encoded teeth 12 and 12' instead of slots 14 and 14'. The target wheel 10 is located near the differential sequential sensor 50 as indicated in FIG. 2B.

Power is supplied to CURRENT SOURCE1 72 and CURRENT SOURCE2 74 through voltage source 70. Power is also supplied to the SIGNAL CONDITIONING CIRCUIT 80 through voltage source 70 but is not shown. CURRENT SOURCE1 72 supplies current to MR1 thereby providing for an output voltage VMR1 from MR1. CURRENT SOURCE2 74 supplies current to MR2 thereby providing for an output voltage $V_{MR2}$ from MR2. Output voltages $V_{MR1}$ and $V_{MR2}$ are input into SIGNAL CONDITIONING CIRCUIT 80 whose output voltage $V_{OUT}$ is an indication of the position of rotation of target wheel 10. It is to be understood that all voltages are measured with respect to ground unless otherwise indicated herein and that CURRENT SOURCE1 72 is matched to CURRENT SOURCE2 74.

FIG. 3B shows, by way of example, a plot 150 of the variation in MR resistances of MR1, via line 120, MR2, via line 130, and MR2−MR1, via line 140, according to resistance scale 100 on the left side of the plot versus crank angle 102 plotted on the bottom of the plot, as well as of the variation in signal outputs from MR1, via line 120, MR2, via line 130, and MR2−MR1, via line 140, according to voltage scale 104 on the right side of the plot versus crank angle 102 plotted on the bottom of the plot. The plot 150 is related to the physical situation at FIG. 3A, wherein an arbitrary slot 14''' passes the differential sequential sensor 50 while the target wheel 10', attached to a crankshaft, rotates, in this example, clockwise (CW) 20', toward increasing crankshaft angle (crank angle). When the differential sequential sensor 50 and the slot 14''' are aligned as shown in FIG. 3A, the resistance of MR1 is equal to the resistance of MR2 causing the output signal of MR1 to also equal the output signal of MR2 thereby producing a crossover point 160 of line 120 and line 130 for the resistances and signals at which time MR1 and MR2 are equidistant from the center of the slot and thereby define the center of the slot which is depicted by the dashed line 110 in FIGS. 3A and 3B.

The variation in resistance and signal output of MR1 depicted by line 120 of plot 150 of FIG. 3B and the variation of resistance and signal output of MR2 depicted by line 130 of the plot are generated as follows. Initially, MR1 and MR2 are adjacent a tooth 12'' of the target wheel 10' and the resistance and signal output of MR1 and MR2 have a relatively high value due to the relatively high magnetic flux density passing through MR1 and MR2, as previously described, and depicted by line 120 and line 130 on the left side of the plot 150 where the crank angle 102 is a minimum. As the crankshaft and, thus, the target wheel 10' rotates CW 20', MR1 begins to pass into the slot 14''' moving, relative to the target wheel, towards tooth 12''' while MR2 is still adjacent to the tooth 12'' but moving, relative to the target wheel, towards the slot. At this time, the resistance and signal output of MR1 begins to decrease due to the decrease in magnetic flux density through MR1 while the resistance and signal output of MR2 remains at a relatively high value as depicted in plot 150 for crank angles 102 between, approximately, 33.4 degrees and 34.4 degrees.

As the target wheel 10' continues to rotate CW 20', MR1 moves, relative to the target wheel, further into the slot 14''' towards tooth 12''' until the magnetic flux density through MR1 has decreased to a minimum at which time the resistance and signal output of MR1 is also a minimum while MR2 moves, relative to the target wheel, towards tooth 12''' but still adjacent tooth 12'' during which time the magnetic flux density through MR2 is still relatively high causing the resistance and signal output of MR2 to remain at a relatively high value as depicted in plot 150 for crank angles 102 between, approximately, 34.4 degrees and 35.8 degrees.

Further CW rotation 20' of the target wheel 10' moves MR1, relative to the target wheel, closer to tooth 12''' thereby increasing the magnetic flux density through MR1 causing the resistance and signal output of MR1 to also increase whereas the magnetic flux density through MR2 rises as MR2 approaches tooth edge 16 then starts to decrease toward a minimum as MR2 enters the slot 14''' thereby causing a slight increase in the resistance and signal output of MR1 as MR1 approaches the tooth edge followed by a reduction in the resistance and signal output of MR2 as MR2 enters the slot as depicted in plot 150 for crank angles 102 between, approximately, 35.8 degrees and 37.0 degrees.

Continued CW rotation 20' of the target wheel 10' produces an increase in the magnetic flux density through MR1 thereby increasing the resistance and signal output of MR1 whereas the magnetic flux density through MR2 decreases thereby decreasing the resistance and signal output of MR2 until a point 160 is reached whereat the resistance of MR1 is equal to the resistance of MR2 causing the output signal of MR1 to also equal the output signal of MR2 thereby producing the crossover point 160 of line 120 and line 130 of plot 150 at which time MR1 and MR2 are equidistant from the center of the slot 14''' and thereby define the center of the slot which is depicted by the dashed line 110 in FIGS. 3A and 3B at a crank angle 102 in the plot 150 of, approximately, 37.6 degrees. As will be described later, a voltage, high or low, is generated at the instant of crossover 160 and defines the center of the slot 14''' of the target wheel 10'. As will also be later described, the signal level at crossover 160 depends on the width W" of the slot 14''' relative to the spacing L between MR1 and MR2 and, thus the width of the slot can be used to encode a high or low voltage.

Continued further CW rotation 20' of the target wheel 10' moves MR1, relative to the target wheel, past tooth edge 18 and then adjacent to tooth 12''' causing the magnetic flux density through MR1 to increase to a relatively high value commensurate with its value adjacent to tooth 12" thereby increasing the resistance and signal output of MR1 to values commensurate with their values adjacent to tooth 12" whereas, during this time, MR2 moves, relative to the target wheel, towards tooth 12''', past tooth edge 18, and then adjacent to tooth 12''' causing the magnetic flux density through MR2 to decrease to a minimum then increase to a value commensurate with its value adjacent to tooth 12" thereby increasing the resistance and signal output of MR1 during the time that the magnetic flux density is decreasing through MR2 thereafter increasing the resistance and signal output to values commensurate with their values adjacent to tooth 12" as depicted in plot 150 for crank angles 102 between, approximately, 37.6 degrees and 42.6 degrees. The above process is now repeated when the next slot is encountered.

FIG. 4 is an example of the variation in MR resistances of MR1, via line 120' and MR2, via line 130', on plot 150' according to resistance scale 100' on the left side of the plot versus crank angle 102' plotted on the bottom of the plot as a wide slot 14' of FIG. 2B of width W' of 7.8 mm passes the differential sequential sensor 50 while the target wheel 10, attached to a crankshaft, rotates toward increasing crank angle. The plot 150' is generated as previously explained for FIG. 3 whereas the spacing L between MR1 and MR2 is 5 mm in the example of FIG. 4.

Figure 5:
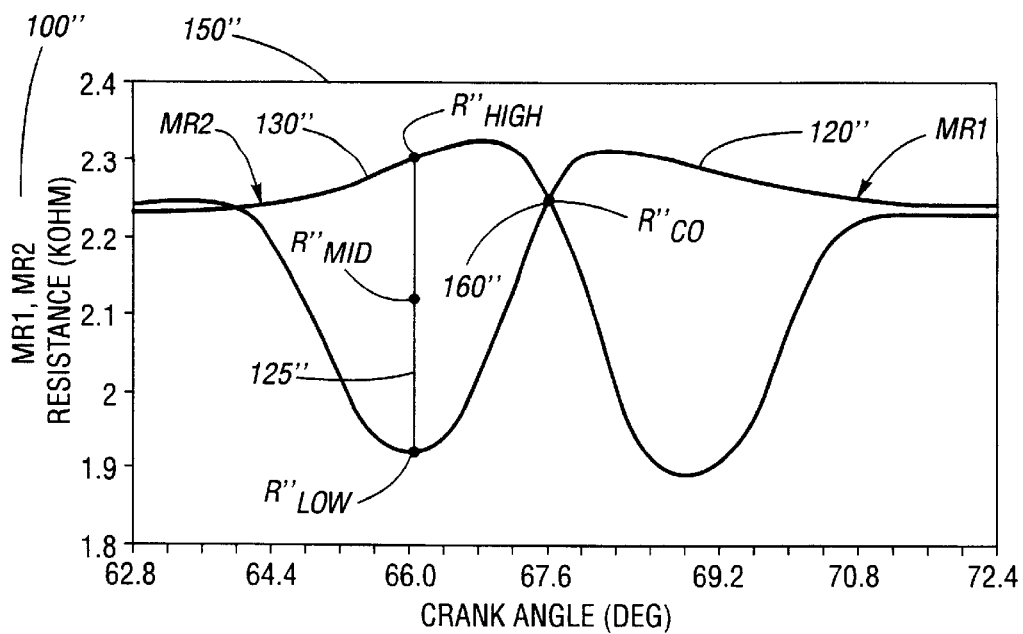
FIG. 5 shows MR resistances and signal outputs from the passage of a narrow slot of a rotating target wheel.

FIG. 5 is an example of the variation in MR resistances of MR1, via line 120" and MR2, via line 130", on plot 150" according to resistance scale 100" on the left side of the plot versus crank angle 102" plotted on the bottom of the plot as a narrow slot 14 of FIG. 2B of width W of 4.3 mm passes the differential sequential sensor 50 while the target wheel 10, attached to a crankshaft, rotates toward increasing crank angle.

The plot 150" is generated as previously explained for FIG. 3 whereas the spacing L between MR1 and MR2 is 5 mm in the example of FIG. 5.

The wide width W' of the slot 14', with respect to the spacing L between MR1 and MR2, in FIG. 4 causes a lower magnetic flux density to be sensed by the MRs when they are equidistant from the center of the slot, with respect to a slot 14 of narrower width W, as in FIG. 5, wherein the spacing L between MR1 and MR2 is the same for both slots. Accordingly, a crossover point 160' in FIG. 4 has a lower resistance, and, thus, a lower signal output since MR1 and MR2 are powered by matched current sources (CURRENT SOURCE1 72 and CURRENT SOURCE2 74 in FIG. 2B), than the crossover point 160" for the narrow slot 14 in FIG. 5. Thus, the signal output of each of MR1 and MR2 at crossover 160' in FIG. 4 or 160" in FIG. 5 depends on the width of the slot. A wide slot 14' causes a lower signal output of each of MR1 and MR2 to occur at crossover 160' in FIG. 4 than the signal output of each of MR1 and MR2 for a narrow slot 14 at crossover 160" in FIG. 5 and is encoded as a binary "0" when crossover occurs, as will be described later. A narrow slot 14 is encoded as a binary "1" when crossover occurs, as will be described later. The binary encoding could also be reversed and, as previously mentioned, width encoded teeth 12 and 12' could be implemented instead of width encoded slots 14 and 14' within the scope of the present invention.

Referring to FIG. 4, the line 125' designates the crank angle 102' at which the difference in resistance, $R'_{HIGH} - R'_{LOW}$, between MR2 and MR1 is the greatest and, thus the crank angle 102' at which the difference in voltage between MR2 and MR1, $V_{MR2} - V_{MR1}$, is also the greatest since MR1 and MR2 are powered by matched current sources (CURRENT SOURCE1 72 and CURRENT SOURCE2 74 in FIG. 2B). The midpoint resistance, $R'_{MID}$, on line 125' designates the average resistance between $R'_{HIGH}$ and $R'_{LOW}$ and has a larger value than the resistance, $R'_{CO}$, at the crossover point 160'. Hence, the signal voltage corresponding to the value of $R'_{MID}$ is greater than the signal voltage corresponding the value of $R'_{CO}$ for a wide slot 14' of FIG. 2B.

Referring to FIG. 5, the line 125" designates the crank angle 102" at which the difference in resistance, $R''_{HIGH} - R''_{LOW}$, between MR2 and MR1 is the greatest and, thus the crank angle 102" at which the difference in voltage between MR2 and MR1, $V_{MR2} - V_{MR1}$, is also the greatest since MR1 and MR2 are powered by matched current sources (CURRENT SOURCE1 72 and CURRENT SOURCE2 74 in FIG. 2B). The midpoint resistance, R"MID, on line 125" designates the average resistance between $R''_{HIGH}$ and $R''_{LOW}$ and has a smaller value than the resistance, $R''_{CO}$, at the crossover point 160". Hence, the signal voltage corresponding to the value of $R''_{MID}$ is less than the signal voltage corresponding the value of $R''_{CO}$ for a narrow slot 14 of FIG. 2B.

Figure 6:
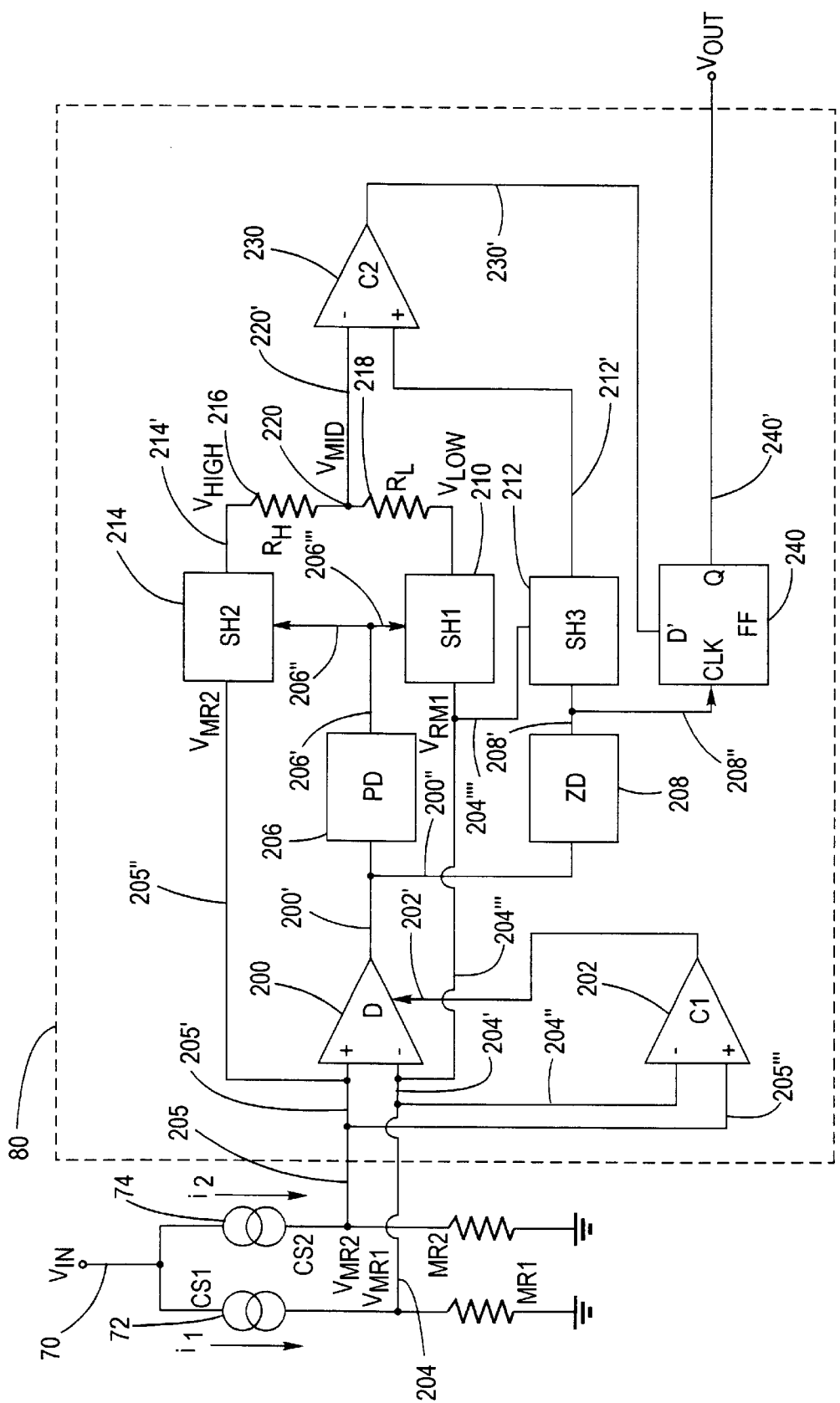
FIG. 6 shows the electronic block diagram of the preferred embodiment of the present invention.

FIG. 6 shows an electronic block diagram of the preferred embodiment of the present invention. It is well known in the art that the resistance of a magnetoresistor will have a larger value when the magnetoresistor is adjacent to a tooth 12 or 12' of a target wheel 10 of FIG. 2B than when the magnetoresistor is adjacent to a slot 14 or 14' of the target wheel. Thus, when MR1 and MR2 are powered by constant current sources, the output voltages $V_{MR1}$ and $V_{MR2}$ in FIG. 2B and FIG. 6 will have higher values when the magnetoresistors MR1 and MR2 are adjacent a tooth 12 or 12' of a target wheel 10 than when MR1 and MR2 are adjacent a slot 14 or 14' of the target wheel. The circuit of FIG. 6 functions as follows.

As the passage of a slot 14 or 14' of FIG. 2B is sensed by MR1 and MR2, the sensor signal $V_{MR1}$ from MR1 is input into the inverting input of differential amplifier (D) 200 via signal lines 204 and 204' whereas the sensor signal $V_{MR2}$ from MR2 is input into the non-inverting input of the differential amplifier via signal lines 205 and 205' to produce a differential signal, $V_D$, at the output of the differential amplifier, which in this case $V_D$ is taken to be $V_{MR2} - V_{MR1}$. The sensor signal $V_{MR1}$ from MR1 is also input into the inverting input of comparator (C1) 202 via signal lines 204 and 204" and the sensor signal $V_{MR2}$ from MR2 is input into the non-inverting input of the comparator via signal lines 205 and 205'''. $V_{MR1}$ is further input to sample and hold1 (SH1) 210 via lines 204, 204', and 204''' as well as sample and hold3 (SH3) 212 via lines 204, 204', 204''', and 204''''. $V_{MR2}$ is additionally input into sample and hold2 (SH2) 214 via lines 205, 205', and 205''.

The comparator 202 has a certain amount of preset predetermined voltage applied to it as a hysteresis thereby causing the output signal of the comparator 202 on line 202' to either switch to a high level when $V_{MR2}$ exceeds $V_{MR1}$ by the amount of the hysteresis or switch to a low level when $V_{MR1}$ exceeds $V_{MR2}$ by the amount of the hysteresis thereby enabling the differential amplifier 200 when the output of the comparator is at a high level and disabling the differential amplifier when the output of the comparator is at a low level. This ensures that the differential amplifier 200, and the rest of the circuit, is enabled only when a slot 14 or 14' is encountered by MR1 and MR2. The differential output signal, $V_D$, from the differential amplifier 200 is input to a peak detector (PD) 206 via line 200' as well as a zero-crossing detector (ZD) 208 via lines 200' and 200".

When the peak detector 206 detects the peak voltage of the differential output signal, $V_D$, it generates a pulse on signal line 206' which is input to sample and hold1 210 via lines 206' and 206''' and sample and hold2 214 via lines 206' and 206". Upon receiving the output pulse from peak detector 206, sample and hold1 210 outputs the value of $V_{MR1}$ at the input to sample and hold1 at this instant, $V_{LOW}$, onto signal line 210' whereas sample and hold2 214 outputs the value of $V_{MR2}$ at the input to sample and hold2 at this instant, $V_{HIGH}$, onto signal line 214'. Since the differential output signal, $V_D$, is equal to $V_{MR2} - V_{MR1}$, at the peak voltage of the differential output signal, $V_{MR2}$ has a higher value than $V_{MR1}$ and the voltage difference between $V_{MR2}$ and $V_{MR1}$ is the greatest. Thus the output voltage of sample and hold2 214, $V_{HIGH}$, on signal line 214' is greater than the output voltage of sample and hold1 210, $V_{LOW}$, on signal line 210'. The midpoint voltage, $V_{MID}$, between $V_{HIGH}$ and $V_{LOW}$ is obtained at junction 220 and signal line 220' by means of resistor 216 and resistor 218 comprising a voltage divider whereby resistor 216 has the same value as resistor 218 and is input into the inverting input of comparator 230 via signal line 220'.

Subsequently, when the value of $V_{MR2}$ and $V_{MR1}$ become equal at crossover, the differential output signal, $V_D$, will have a value of zero thereby effecting the zero-crossing detector 208 to generate an output pulse on signal line 208' at this instant, which occurs well after $V_{MID}$ has been generated, and is then input to sample and hold3 212 via signal line 208' and to the clock input (CLK) of flip flop (FF) 240 via signal lines 208' and 208". At crossover, the leading edge of the output pulse from the zero-crossing detector 208 activates sample and hold3 212 to output the value of $V_{MR1}$ at the input to sample and hold3 at this instant, VCO, onto signal line 212' to the non-inverting input of comparator 230. It is noted that since the value of $V_{MR1}$ equals the value of $V_{MR2}$ at this instant, $V_{MR2}$ could be the signal input to sample and hold3 on signal line 204'''' instead of $V_{MR1}$ within the scope of the present invention. If desired, however, the signal $V_{MR1}$ can be fed directly into the noninverting input of the comparator 230, thus eliminating the need for the sample and hold circuit.

Comparator 230 compares the value of $V_{CO}$ to the value of $V_{MID}$. If the value of $V_{CO}$ is greater than the value of $V_{MID}$, the voltage at the output of comparator 230 on signal line 230' will have a high value signifying that the passage of a narrow slot 14 in FIG. 2B was sensed by MR1 and MR2 since a narrow slot has a value of $V_{CO}$ which is higher at the crossover point 160" in FIG. 5 than the value of $V_{MID}$. Otherwise, if the value of $V_{CO}$ is less than the value of $V_{MID}$, the voltage at the output of comparator 230 on signal line 230' will have a low value signifying that the passage of a wide slot 14' in FIG. 2B was sensed by MR1 and MR2 since a wide slot has a value of $V_{CO}$ which is lower at the crossover point 160' in FIG. 4 than the value of $V_{MID}$. The voltage at the output of comparator 230 is input to the data input (D') of flip flop 240 via signal line 230'.

The leading edge of the output pulse from the zero-crossing detector 208 also activates flip flop 240 to output the voltage appearing at the data input (D') of the flip flop, on signal line 230', as $V_{OUT}$ at the Q output of the flip flop onto signal line 240'. A low value of voltage on signal line 230' to flip flop 240 will cause the flip flop output $V_{OUT}$ to be a low voltage while a high value of voltage on line 230' to the flip flop will cause the flip flop output $V_{OUT}$ to be a high voltage. These two distinctly different voltage values can arbitrarily be assigned binary values of "0" and "1" designating whether the passage of a wide slot 14' or a narrow slot 14 was sensed by MR1 and MR2.

Figure 7A:
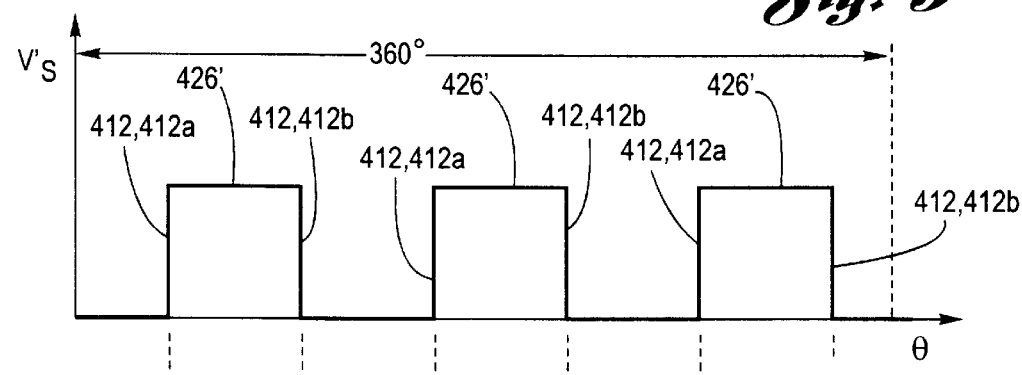
FIGS. 7A–7C show examples of pulse generator outputs compatible with 3X engine operation.
Figure 7B:
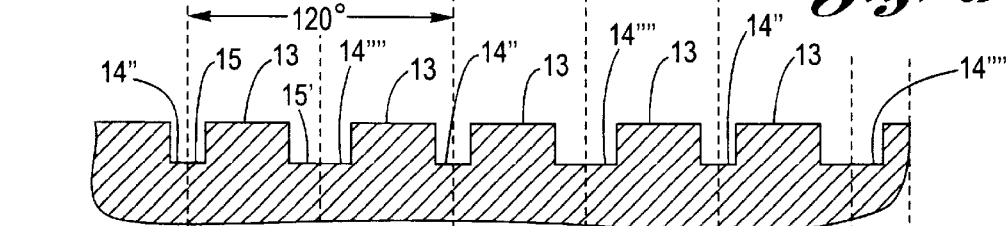
Figure 7C:
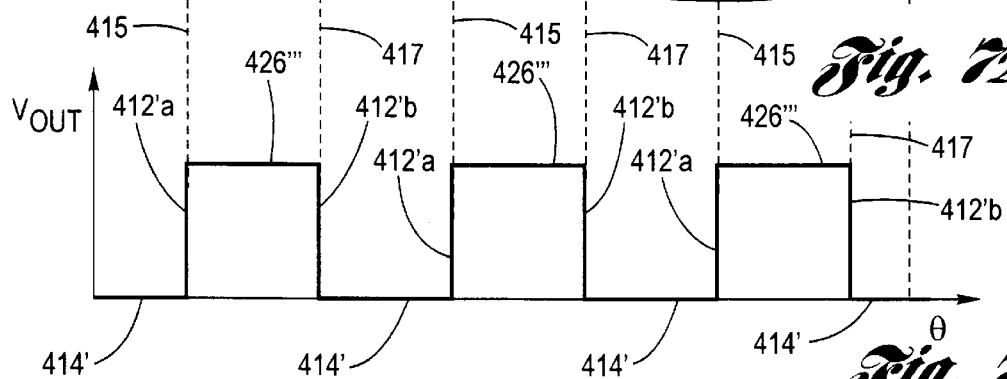

An example of flip flop 240 output on signal line 240', generated with a target wheel consisting of six teeth and six slots, emulating a 3X desired target wheel format, according to the present invention, is depicted in FIGS. 7A, 7B and 7C.

Figure 1B:
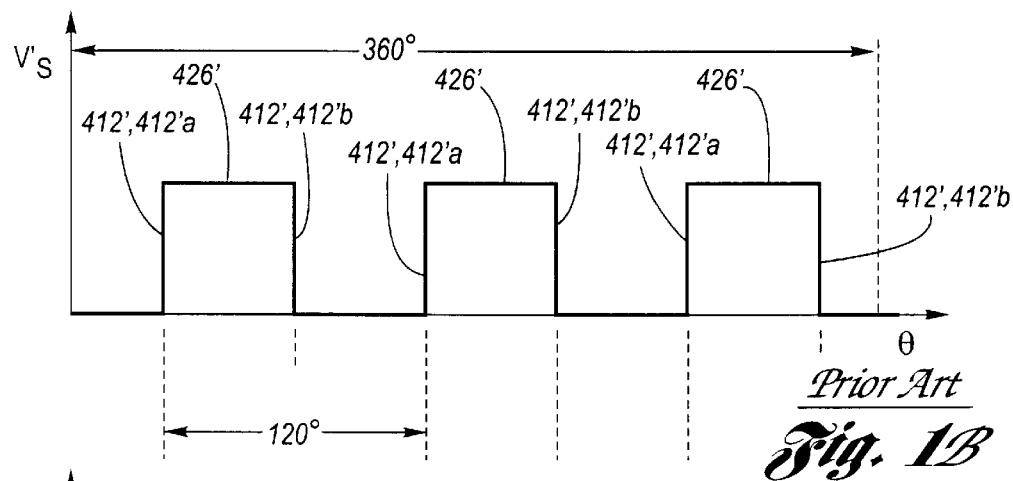
FIG. 1B depicts an example of the ideal digital signal output according to the prior art environment of use.
Figure 1C:
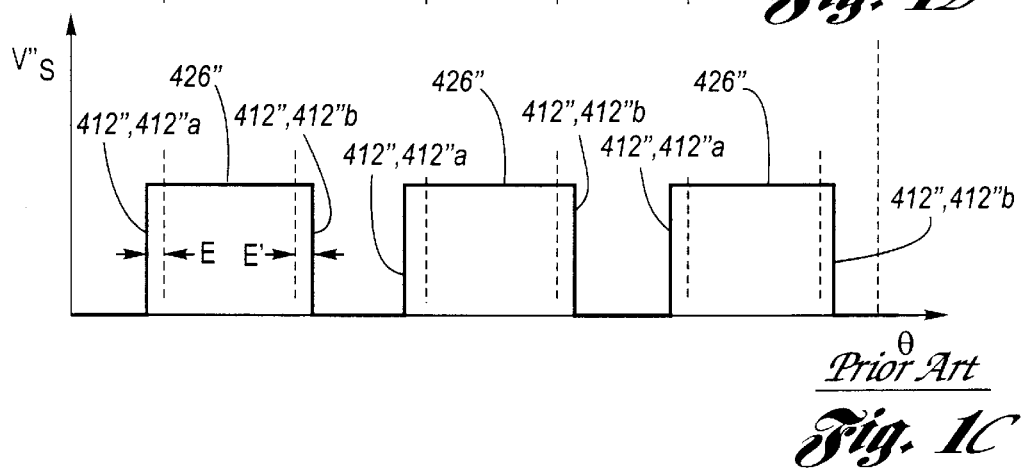
Figure 1C depicts an example of the actual digital signal output according to the prior art environment of use.

FIG. 1B is repeated in FIG. 7A for clarity. FIG. 7B depicts the target wheel 10" (this is the actual target wheel) having three narrow slots 14" and three wide slots 14"" with six teeth 13 respectively therebetween. Lines 415 depict where the center 15 of the narrow slots 14" determine, as shown in FIG. 7C, the rising edges 412'a of the output $V_{OUT}$ from the flip flop 240 whereas lines 417 depict where the center 15' of the wide slots 14"" determine the falling edges 412'b of the output $V_{OUT}$ from the flip flop. The rising edges 412'a and falling edges 412'b define the signal pattern 426''', 414' of the flip flop 240 output $V_{OUT}$ on signal line 240'. A comparison of FIGS. 7A and 7C shows that they are identical, wherein FIG. 7C depicts the rising and falling tooth edges of a desired target wheel emulated from the actual target wheel. Thus, the target wheel of use having 2n teeth and 2n slots of two distinct sequential widths emulates an nX target wheel wherein air gap and temperature variations are accounted for. It should be noted that while a flip flop is described herein to provide switching (at tooth or slot centers) between the two distinct voltage outputs, any analogous bistable electronic device will suffice.

Figure 8:
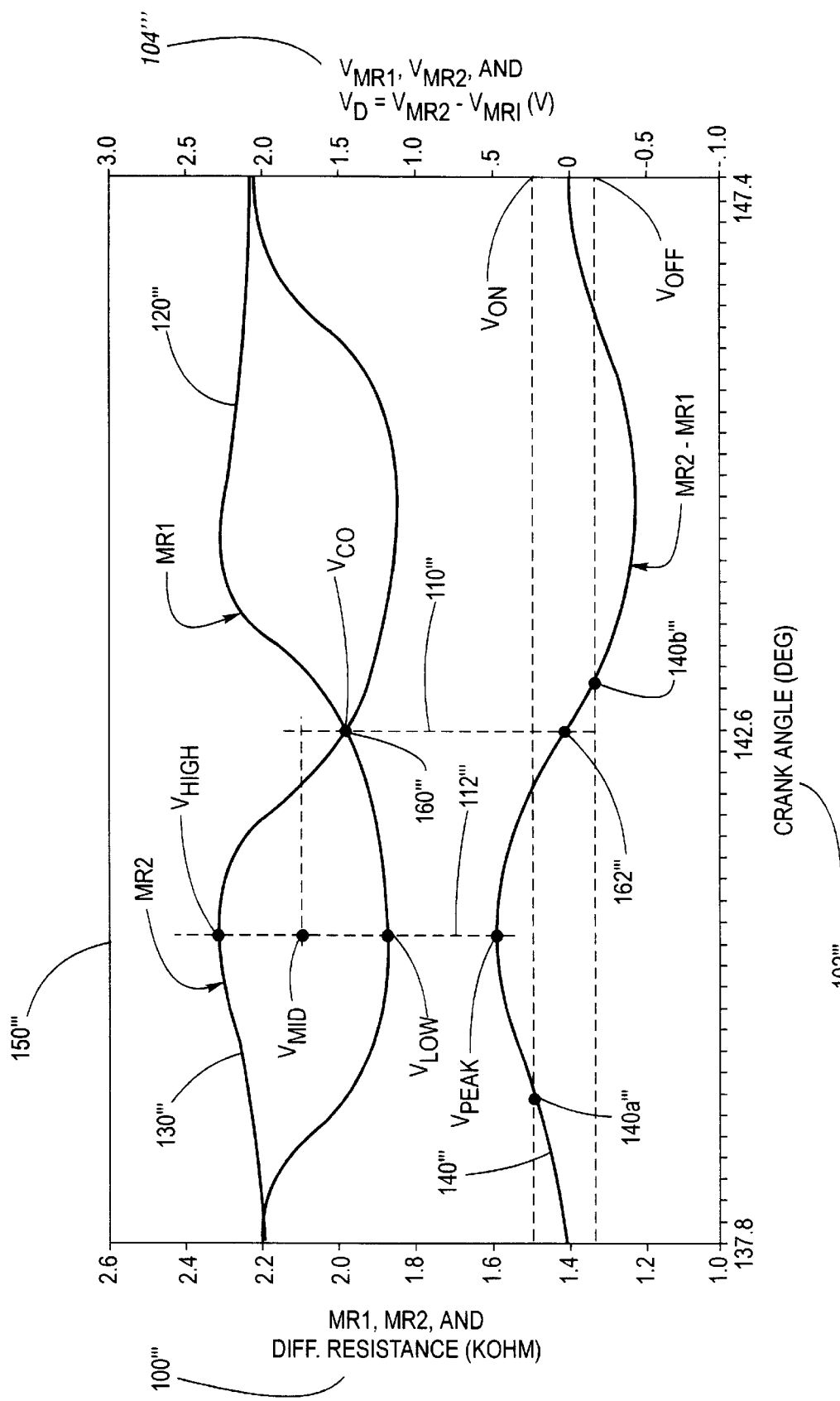
FIG. 8 depicts the decoding concept of FIG. 6 applied to the MR resistances and signal outputs from the passage of a slot of a rotating target wheel.

FIG. 8 depicts, by way of example, the decoding concept of FIG. 6 applied to the passage of a wide slot 14' of a rotating target wheel 10. FIG. 8 shows the variation in MR resistances of MR1, via line 120''', MR2, via line 130''', and MR2−MR1, via line 140''', on plot 150''' according to resistance scale 100''' on the left side of the plot versus crank angle 102''' plotted on the bottom of the plot as well as the variation in signal outputs from MR1, via line 120''', MR2, via line 130''', and MR2−MR1, via line 140''', according to voltage scale 104''' on the right side of the plot versus crank angle 102''' plotted on the bottom of the plot as a wide slot 14 passes the differential sequential sensor 50 while the target wheel 10, attached to a crankshaft, rotates, in this example, toward increasing crankshaft angle (crank angle). Line 140''' represents the differential output signal, $V_D$, with respect to voltage scale 104'''. When the differential sequential sensor 50 and the slot 14 are aligned as shown in FIG. 3, the resistance of MR1 is equal to the resistance of MR2 causing the output signal of MR1 to also equal the output signal of MR2 thereby producing a crossover point 160''' in FIG. 8 of line 120''' and line 130''' for the resistances and signals as well as a zero crossing point 162''' of line 140''' for the differential output signal, $V_D$, at which time MR1 and MR2 are equidistant from the center of the slot 14' and thereby define the center of the slot which is depicted by the dashed line 110'''. The plot 150''' is generated as previously explained for FIG. 3.

In FIG. 8, $V_{ON}$ represents the amount of preset predetermined voltage applied to comparator 202 of FIG. 6 as a hysteresis thereby causing the output signal of the comparator on line 202' to switch to a high level when $V_{MR2}$ exceeds $V_{MR1}$ by the amount of the hysteresis at point 140a'''. $V_{OFF}$ represents the amount of preset predetermined voltage applied to comparator 202 of FIG. 6 as a hysteresis thereby causing the output signal of the comparator on line 202' to switch to a low level when $V_{MR1}$ exceeds $V_{MR2}$ by the amount of the hysteresis at point 140b'''. The peak voltage of the differential output signal, $V_D$, detected by the peak detector 206 of FIG. 6 is designated $V_{PEAK}$ on line 112'''. As can be seen from FIG. 8, the value of $V_{CO}$, the crossover voltage, is less than the value of $V_{MID}$, the midpoint voltage at the peak of the differential output signal, $V_D$. Thus, the voltage at the output of comparator 230 in FIG. 6 will have a low value and, hence, the flip flop 240 outputs a low voltage signifying that the passage of a wide slot 14' was sensed by MR1 and MR2 and determines the falling edge of a tooth of a 3X target wheel and defines the slot of a 3X target wheel as previously explained.

It is to be understood that while magnetoresistors (MRs) were exemplified in the foregoing detailed description of a preferred embodiment of the present invention, other analogous sensing elements, such as Hall elements may be utilized, the class of such sensors being inclusively denoted as magnetostatic elements.

To those skilled in the art to which this invention appertains, the above described preferred embodiment may be subject to change or modification. Such change or modification can be carried out without departing from the scope of the invention, which is intended to be limited only by the scope of the appended claims.

What is claimed is:

1. An apparatus for detecting rotational position using a desired target wheel emulated from an actual target wheel, comprising:

a differential sensor comprising a first magnetostatic element and a second magnetostatic element matched to said first magnetostatic element;

magnetic field means for magnetically biasing said differential sensor;

an actual target wheel having 2n slots and 2n teeth arranged circumferentially in a serially repeating pattern of a narrow slot followed by a wide slot each slot being separated by a tooth of the 2n teeth wherein each tooth of the 2n teeth has a mutually equal width, said target wheel being rotatively disposed in relation to said differential sensor, said first and second magnetostatic elements being spaced circumferentially with respect to said target wheel;

current source means connected with said differential sensor for providing first and second voltages respectively from each of said first and second magnetostatic elements responsive to each slot of said 2n slots successively passing said differential sensor; and signal conditioning circuit means connected with said differential sensor for providing two distinctly different voltage outputs responsive to said first and second voltages, wherein a first distinct voltage output is provided between centers of a wide slot and a next serially adjacent narrow slot, and wherein a second distinct voltage output is provided between centers of the serially adjacent narrow slot and a next serially adjacent wide slot;

wherein said current source means provides matched currents to each of said first and second magnetostatic elements; and wherein said magnetic field means provides matched biasing magnetic fields to each of said first and second magnetostatic elements; and wherein a desired target wheel having n slots and n teeth is emulated from said two distinct voltage outputs, wherein each tooth and each slot of the desired target wheel has a mutually equal width, and wherein each tooth of the desired target wheel is assigned to each first distinct voltage output, and each slot of the desired target wheel is assigned to each second distinct voltage output.

2. The apparatus of claim 1, wherein said signal conditioning means comprises:

differential amplifier means for converting said first and second voltages into a differential output signal;

peak detection means for detecting a peak voltage of said differential output signal;

first sampling means for sampling said first and second voltages responsive to said peak detection means detecting said peak voltage to thereby provide a sampled first voltage of said first voltage and a sampled second voltage of said second voltage;

means for determining a midpoint voltage between said sampled first voltage and said sampled second voltage;

zero detection means for detecting a zero voltage of said differential output signal;

second sampling means for sampling at least one of said first and second voltages responsive to said zero detection means detecting said zero voltage to thereby detect a crossover voltage;

comparator means for comparing said midpoint voltage to said crossover voltage, and for providing the two distinctly different voltage outputs, wherein when a narrow slot passes said differential sensor said crossover voltage exceeds said midpoint voltage, and wherein when a wide slot passes said differential sensor said midpoint voltage exceeds said crossover voltage; and bistable means for providing, responsive to said comparator means, the first distinct voltage output between centers of a wide slot and a next serially adjacent narrow slot, and the second distinct voltage output between centers of the serially adjacent narrow slot and a next serially adjacent wide slot.

3. The apparatus of claim 2, wherein said signal conditioning means further comprises means for selectively enabling said differential amplifier means responsive to passage of each slot with respect to said differential sensor.

4. An apparatus for detecting rotational position using a desired target wheel emulated from an actual target wheel, comprising:

a differential sensor comprising a first magnetostatic element and a second magnetostatic element matched to said first magnetostatic element;

magnetic field means for magnetically biasing said differential sensor;

an actual target wheel having 2n slots and 2n teeth arranged circumferentially in a serially repeating pattern of a narrow tooth followed by a wide tooth each tooth being separated by a slot of the 2n slots wherein each slot of the 2n slots has a mutually equal width, said target wheel being rotatively disposed in relation to said differential sensor, said first and second magnetostatic elements being spaced circumferentially with respect to said target wheel;

current source means connected with said differential sensor for providing first and second voltages respectively from each of said first and second magnetostatic elements responsive to each tooth of said 2n teeth successively passing said differential sensor; and signal conditioning circuit means connected with said differential sensor for providing two distinctly different voltage outputs responsive to said first and second voltages, wherein a first distinct voltage output is provided between centers of a wide tooth and a next serially adjacent narrow tooth, and wherein a second distinct voltage output is provided between centers of the serially adjacent narrow tooth and a next serially adjacent wide tooth;

wherein said current source means provides matched currents to each of said first and second magnetostatic elements; and wherein said magnetic field means provides matched biasing magnetic fields to each of said first and second magnetostatic elements; and wherein a desired target wheel having n slots and n teeth is emulated from said two distinct voltage outputs, wherein each tooth and each slot of the desired target wheel has a mutually equal width, and wherein each tooth of the desired target wheel is assigned to each first distinct voltage output, and each slot of the desired target wheel is assigned to each second distinct voltage output.

5. The apparatus of claim 4, wherein said signal conditioning means comprises:

differential amplifier means for converting said first and second voltages into a differential output signal;

peak detection means for detecting a peak voltage of said differential output signal;

first sampling means for sampling said first and second voltages responsive to said peak detection means detecting said peak voltage to thereby provide a sampled first voltage of said first voltage and a sampled second voltage of said second voltage;

means for determining a midpoint voltage between said sampled first voltage and said sampled second voltage;

zero detection means for detecting a zero voltage of said differential output signal;

second sampling means for sampling at least one of said first and second voltages responsive to said zero detection means detecting said zero voltage to thereby detect a crossover voltage;

comparator means for comparing said midpoint voltage to said crossover voltage, and for providing the two distinctly different voltage outputs, wherein when a narrow tooth passes said differential sensor said crossover voltage exceeds said midpoint voltage, and wherein when a wide tooth passes said differential sensor said midpoint voltage exceeds said crossover voltage; and bistable means for providing, responsive to said comparator means, the first distinct voltage output between centers of a wide tooth and a next serially adjacent narrow tooth, and the second distinct voltage output between centers of the serially adjacent narrow tooth and a next serially adjacent wide tooth.

6. The apparatus of claim 5, wherein said signal conditioning means further comprises means for selectively enabling said differential amplifier means responsive to passage of each slot with respect to said differential sensor.

7. A method for detecting rotational position using a desired target wheel emulated from an actual target wheel, said method comprising the steps of:

fabricating an actual target wheel having 2n slots and 2n teeth, the 2n teeth being arranged circumferentially in a serially repeating pattern of a wide tooth followed by a narrow tooth, each tooth being separated by a slot of the 2n slots wherein each slot of the 2n slots has a mutually equal width; and detecting rotation of a desired target wheel emulated from rotation of the actual target wheel, wherein the desired target wheel has n slots and n teeth and wherein each tooth and each slot thereof has a mutually equal width, said step of detecting comprising:

generating a first voltage responsive to passage of a tooth of the actual target wheel across a first predetermined location;

generating a second voltage responsive to passage of the tooth across a second predetermined location;

converting said first and second voltages into a differential output signal;

detecting a peak voltage of said differential output signal;

sampling said first and second voltages responsive to detection of said peak voltage to thereby provide a sampled first voltage of said first voltage and a sampled second voltage of said second voltage and thereby provide a midpoint voltage therebetween;

detecting a zero voltage of the differential output signal;

sampling at least one of the first and second voltages responsive to detection of said zero voltage to thereby detect a crossover voltage;

comparing said midpoint voltage to said crossover voltage; and generating two distinctly different voltage outputs, responsive to said step of comparing, wherein a first distinct voltage output is provided between centers of a wide tooth and a next serially adjacent narrow tooth, and wherein a second distinct voltage output is provided between centers of the serially adjacent narrow tooth and a next serially adjacent wide tooth;

wherein when a narrow tooth passes said first and second predetermined locations said crossover voltage exceeds said midpoint voltage, and wherein when a wide tooth passes said first and second predetermined locations said midpoint voltage exceeds said crossover voltage.

8. A method for detecting rotational position using a desired target wheel emulated from an actual target wheel, said method comprising the steps of:

fabricating an actual target wheel having 2n slots and 2n teeth, the 2n slots being arranged circumferentially in a serially repeating pattern of a wide slot followed by a narrow slot, each slot being separated by a tooth of the 2n teeth wherein each tooth of the 2n teeth has a mutually equal width; and detecting rotation of a desired target wheel emulated from rotation of the actual target wheel, wherein the desired target wheel has n slots and n teeth and wherein each tooth and each slot thereof has a mutually equal width, said step of detecting comprising:

generating a first voltage responsive to passage of a slot of the actual target wheel across a first predetermined location;

generating a second voltage responsive to passage of the slot across a second predetermined location;

converting said first and second voltages into a differential output signal;

detecting a peak voltage of said differential output signal;

sampling said first and second voltages responsive to detection of said peak voltage to thereby provide a sampled first voltage of said first voltage and a sampled second voltage of said second voltage and thereby provide a midpoint voltage therebetween;

detecting a zero voltage of the differential output signal;

sampling at least one of the first and second voltages responsive to detection of said zero voltage to thereby detect a crossover voltage;

comparing said midpoint voltage to said crossover voltage; and generating two distinctly different voltage outputs, responsive to said step of comparing, wherein a first distinct voltage output is provided between centers of a wide slot and a next serially adjacent narrow slot, and wherein a second distinct voltage output is provided between centers of the serially adjacent narrow slot and a next serially adjacent wide slot;

wherein when a narrow slot passes said first and second predetermined locations said crossover voltage exceeds said midpoint voltage, and wherein when a wide slot passes said first and second predetermined locations said midpoint voltage exceeds said crossover voltage.

* * * * *